J. C. HARMON & C. F. WARNING.
INSECT DESTROYER.
APPLICATION FILED MAY 4, 1914.
1,125,519.
Patented Jan. 19, 1915.
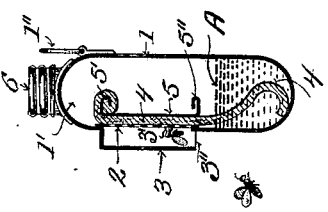
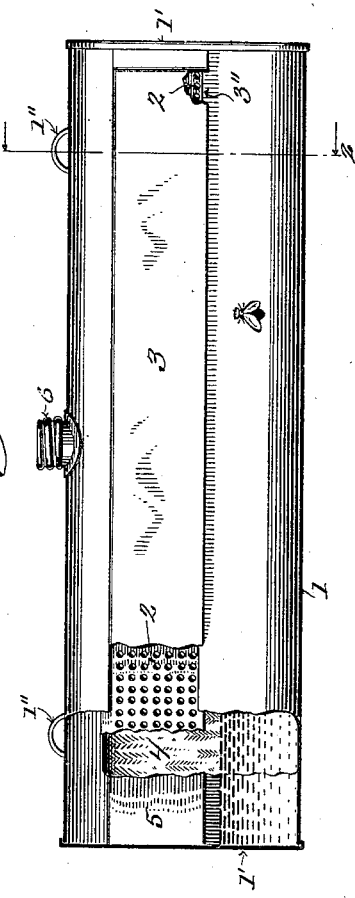
Witnesses:
Cascade Young
May Downey
Inventors
John C. Harmon
Charles F. Warning
By Oliphant Young
Attorneys
THE NORRIS PETERS CO., PHOTO-LITHO., WASHINGTON, D. C.

UNITED STATES PATENT OFFICE.

JOHN C. HARMON AND CHARLES F. WARNING, OF OSHKOSH, WISCONSIN.

INSECT-DESTROYER.

1,125,519.  Specification of Letters Patent.  Patented Jan. 19, 1915.

Application filed May 4, 1914. Serial No. 836,062.

*To all whom it may concern:*

Be it known that we, JOHN C. HARMON and CHARLES F. WARNING, both citizens of the United States, and residents of Oshkosh, in the county of Winnebago and State of Wisconsin, have invented certain new and useful Improvements in Insect-Destroyers; and we do hereby declare that the following is a full, clear, and exact description thereof.

Our invention refers to insect exterminators or destroyers and the primary object of said invention is to provide a simple, economical and effective device of the above character comprising an incased poison body having a chamber leading thereto with a comparatively small mouth, whereby access is had to the poison body by small insects only, such as flies, or the like, but will exclude therefrom humans, dumb animals and birds, to thus insure safety of the latter against the deadly effects of the poison.

Specific objects of our invention are to provide a reservoir containing poisonous fluid and a body in the form of a wick for absorbing said fluid, the wick being partially exposed within a chamber constituting a safety shield, which chamber is provided with a comparatively small mouth to permit the entrance of insects to the said chamber, whereby they may feed upon the wick substance to the exclusion of other live creatures; to provide an insect-receiving chamber for the wick so arranged and constructed as to form a protecting shield for an exposed portion of the wick whereby access to the latter is had only by small insects, the shield also serving as a protector for the exposed surface of the wick against climatic conditions. Thus moisture is excluded from the exposed surface of the wick, whereby its poisonous substance is protected from dilution to the detriment of its strength and the moistened wick is also protected against the drying influence of the sun rays and currents of air which would cause the supply of poisonous fluid to be depleted by unnecessary evaporation; to provide means for supporting the wick within a casing containing the poisonous fluid, whereby the surplus fluid supplied to the wick by capillary attraction is caused to be returned to the body of said fluid; to provide a perforated or screened surface in connection with the wick casing against which the wick is faced for exposure within the protecting chamber; to provide a construction of casing or tank which is sealed in such manner that the poisonous liquid is checked from flowing therefrom irrespective of the position of the tank or casing with the exception possibly of a slight seepage through the exposed surface of the wick, which, in practice, would be trivial; to provide a tank or casing having a shielded protecting chamber in connection therewith, which chamber is vertically disposed when the tank is in its normal position, whereby insects that are destroyed, due to feeding upon the poisonous material, will drop by gravity from the device.

With the above and other minor objects in view the invention consists in certain peculiarities of construction and combination of parts as set forth hereinafter with reference to the accompanying drawings and subsequently claimed.

In the drawings Figure 1 represents a front elevation of an insect destroyer embodying the features of our invention with parts broken away and parts in section to more clearly illustrate certain structural features, and Fig. 2, a cross-section of the same, the section being indicated by line 2—2 of Fig. 1.

Referring by characters to the drawings, 1 represents a casing, the bottom portion of which forms a reservoir for a poisonous fluid A, which fluid is preferably compounded from an arsenic base with some pungent substance to attract insects, it being understood, however, that any poisonous ingredient may be utilized for effecting the desired result.

One of the vertical walls of the casing is provided with a strip 2, which strip is perforated or composed of any desirable screen material. The perforated wall strip is protected by a shield-plate 3, which plate forms a vertically disposed chamber 3' having a comparatively small mouth 3'' at its lower end, whereby minute insects only may enter said chamber such as flies, mosquitos or the like.

Fitted against the perforated strip within the casing is a poisonous body in the form of a wick 4, which wick is confined between the perforated strip and a longitudinally disposed backing-plate 5, the ends of which backing-plate are secured in any suitable manner to the heads 1' of the casing. The upper end of the wick 4 is confined to the backing-plate by nested engagement with a crimped flange 5' of said plate and the lower edge of the backing-plate is also formed with a longitudinal flange 5", the said flanges serving to stiffen the backing-plate throughout its length.

As shown, the mouth 3" of the chamber is upon a plane approximately alined with the lower edge of the perforated strip 2, whereby the wick which is exposed and backed up against the perforated strip, is protected by the shield-plate 3. Hence, in order to have access to the wick, entrance within the chamber 3' must be effected and, owing to the restricted mouth of said chamber, the latter is only accessible to small insects. The lower end of the wick, after passing from its supporting or backing-plate 5, is suspended freely within the poisonous fluid A, which fluid, under ordinary conditions, is maintained upon a level below the lower edge of the perforated strip 2. The casing is also provided, in this exemplification of our invention, with suspension rings 1", and a cap-closed filling-neck 6, which neck may be provided with any form of check-valve whereby the poisonous contents of the casing or reservoir cannot be emptied therefrom, even though the tank be inverted and the filling neck cap removed. It is also obvious, owing to the fact that the wick forms a backing for the perforated plate, should the casing be tilted to a position wherein its front wall containing the perforated plate would, in effect, become a bottom, the liquid would not flow out through said plate as the wick would absorb the major portion of said liquid. Attention is also called to the fact that the wick, being disposed vertically, capillary attraction will cause the fluid to travel upward and any overflow will drop back into the reservoir portion of the casing from the head of the wick. Thus a circuit is formed for the fluid which will, at all times, maintain a uniform flow through the body of the wick, insuring sufficient saturation of the same with poisonous fluid to kill any insects that may feed upon the latter.

The shield-plate 3, as arranged, not only serves to protect the exposed surface of the poisonous body from humans, animals or birds, but it also serves as a shield to protect the exposed portion of the poisonous body from weather conditions, it being an essential feature of the invention to provide safety against injury or life, except that of the insects to be destroyed.

The application of our invention may be varied indefinitely as, for example, the devices may be suspended within a building or exteriorly thereof where desirable, or they may be attached to animals in any convenient position to protect them against the annoyance of insects, which insects will be attracted by the pungent odor and will thus feed upon the poisonous substance and be destroyed. It is also manifest that we may, without departing from the spirit of our invention, vary the design of the container or casing indefinitely and that, as a substitute for the wick and poisonous fluid, a poisonous dry body of any shape may be employed such as, for example, a strip or tablet may be molded, containing the desired poisonous ingredients and any form of pungent substance may be employed for attracting the insects, which pungent substance may form one of the ingredients of the strip or tablet or it may comprise a separate element.

We claim:

1. An insect destroyer comprising a horizontally disposed casing having a closed top and bottom and vertical side walls constituting a fluid reservoir, one of said side walls being provided with a slot extending longitudinally thereof, a perforated strip fitted over the slot, a backing strip arranged parallel with the perforated strip within the casing, said backing strip being spaced from the perforated strip, a wick fitted between the backing strip and perforated strip having an end extending into the reservoir portion of said casing, and a longitudinally disposed shield having a roof wall and end walls secured to the side wall of the casing about its aperture the lower open edge of said shield-plate forming a restricted mouth.

2. An insect destroyer comprising a horizontally disposed casing having a closed top and bottom and vertical side walls constituting a fluid reservoir, one of said side walls being provided with an elongated slot therein, a wick fitted into the casing provided with an exposed face abutting the slot, and a shield extending over the wall aperture, the said shield being closed thereabout upon three sides having an open bottom end to form a restricted mouth entrance to the shield chamber about the exposed portion of the wick.

In testimony that we claim the foregoing we have hereunto set our hands at Oshkosh in the county of Winnebago and State of Wisconsin in the presence of two witnesses.

JOHN C. HARMON.
CHARLES F. WARNING.

Witnesses:
KEATS RICHARDS,
ERNE R. SIMPSON.

Copies of this patent may be obtained for five cents each, by addressing the "Commissioner of Patents, Washington, D. C."